(12) United States Patent
Liu et al.

(10) Patent No.: US 12,079,480 B2
(45) Date of Patent: Sep. 3, 2024

(54) METHOD, DEVICE, AND COMPUTER PROGRAM PRODUCT FOR LATENCY PROCESSING

(71) Applicant: DELL PRODUCTS L.P., Round Rock, TX (US)

(72) Inventors: Bing Liu, Tianjin (CN); Lingdong Weng, Beijing (CN); Zheng Li, Beijing (CN)

(73) Assignee: DELL PRODUCTS L.P., Round Rock, TX (US)

( * ) Notice: Subject to any disclaimer, the term of this patent is extended or adjusted under 35 U.S.C. 154(b) by 3 days.

(21) Appl. No.: 17/874,070

(22) Filed: Jul. 26, 2022

(65) Prior Publication Data
US 2023/0400983 A1 Dec. 14, 2023

(30) Foreign Application Priority Data
Jun. 9, 2022 (CN) .......................... 202210653814.X

(51) Int. Cl.
*G06F 3/06* (2006.01)
(52) U.S. Cl.
CPC .......... *G06F 3/0611* (2013.01); *G06F 3/0655* (2013.01); *G06F 3/0673* (2013.01)
(58) Field of Classification Search
CPC ..... G06F 3/0611; G06F 3/0655; G06F 3/0673
See application file for complete search history.

(56) References Cited

U.S. PATENT DOCUMENTS

2018/0307609 A1* 10/2018 Qiang .................. G06F 12/0875
2022/0066645 A1* 3/2022 Prasad .................... G06F 3/061

OTHER PUBLICATIONS

Xu et al.,. 2019. Finding and Fixing Performance Pathologies in Persistent Memory Software Stacks. In Proceedings of the 24th International Conference on ASPLOS '19. Association for Computing Machinery, New York, NY, USA, 427-439. https://doi.org/10.1145/3297858.3304077 (Year: 2019).*

* cited by examiner

*Primary Examiner* — Eric T Oberly
(74) *Attorney, Agent, or Firm* — WOMBLE BOND DICKINSON (US) LLP

(57) ABSTRACT

Embodiments of the present disclosure relate to a method, a device, and a computer program product for latency processing. The method includes: in response to that a data persistence operation occurs in a system, acquiring a record for the operation, wherein the record includes an actual latency of the operation and a group of measurements of a group of states of the system within a predetermined time period of the occurrence of the operation. The method further includes: in response to that the actual latency of the operation is greater than a first threshold, generating an estimated latency of the operation by using a trained predictor on the basis of the group of measurements. The method further includes: determining a difference between the actual latency and the estimated latency, and in response to that the difference is less than a second threshold, identifying one or more states from the group of states on the basis of the record and the estimated latency. When there is a high-latency problem in the data persistence operation of the system, the solution of the present disclosure can identify the most major factors that lead to this problem, and thus can provide targeted repair measures to users.

19 Claims, 4 Drawing Sheets

METHOD, DEVICE, AND COMPUTER PROGRAM PRODUCT FOR LATENCY PROCESSING

CROSS-REFERENCE TO RELATED APPLICATION

This patent application claims priority, under 35 U.S.C. § 119, of Chinese Patent Application No. 202210653814.X, filed Jun. 9, 2022, which is incorporated by reference in its entirety.

TECHNICAL FIELD

Embodiments of the present disclosure relate to system fault diagnosis and, more specifically, to a method, a device, and a computer program product for latency processing.

BACKGROUND

In order to improve the running efficiency of a system, during processing of a file, data is usually first written to an internal memory, and later, when appropriate, to a more persistent storage device (such as a disk). A progress can invoke a data persistence operation (such as using a fsync function) of the system to flush the internal memory and synchronize updated content to a disk.

SUMMARY OF THE INVENTION

Embodiments of the present disclosure provide a solution for latency processing.

In a first aspect of the present disclosure, a method for latency processing is provided, including: in response to that a data persistence operation occurs in a system, acquiring a record for the operation, wherein the record includes an actual latency of the operation and a group of measurements of a group of states of the system within a predetermined time period of the occurrence of the operation; in response to that the actual latency is greater than a first threshold, generating an estimated latency of the operation by using a trained predictor on the basis of the group of measurements; determining a difference between the actual latency and the estimated latency; and in response to that the difference is less than a second threshold, identifying one or more states from the group of states on the basis of the record and the estimated latency.

In a second aspect of the present disclosure, an electronic device is provided. The electronic device includes a processor and a memory that is coupled to the processor and has instructions stored therein. The instructions, when executed by the processor, cause the electronic device to execute actions including: in response to that a data persistence operation occurs in a system, acquiring a record for the operation, wherein the record includes an actual latency of the operation and a group of measurements of a group of states of the system within a predetermined time period of the occurrence of the operation; in response to that the actual latency is greater than a first threshold, generating an estimated latency of the operation by using a trained predictor on the basis of the group of measurements; determining a difference between the actual latency and the estimated latency; and in response to that the difference is less than a second threshold, identifying one or more states from the group of states on the basis of the record and the estimated latency.

In a third aspect of the present disclosure, a computer program product is provided. The computer program product is tangibly stored on a computer-readable medium and includes machine-executable instructions. The machine-executable instructions, when executed, cause a machine to execute the method according to the first aspect of the present disclosure.

The Summary of the Invention is provided to introduce a selection of concepts in a simplified manner, which will be further described in the Detailed Description below. The Summary of the Invention part is neither intended to identify key features or major features of the present disclosure, nor intended to limit the scope of the present disclosure.

BRIEF DESCRIPTION OF THE SEVERAL VIEWS OF THE DRAWINGS

By description of example embodiments of the present disclosure in more detail with reference to the accompanying drawings, the above and other objectives, features, and advantages of the present disclosure will become more apparent, in which.

Throughout the drawings, the same or similar reference numerals represent the same or similar elements.

DETAILED DESCRIPTION OF THE EMBODIMENTS

Figure 1:
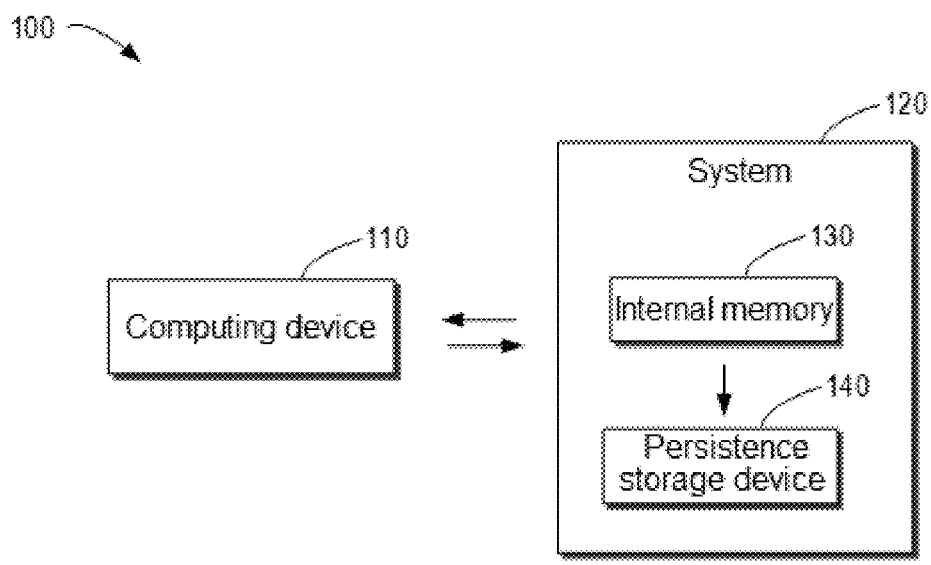
FIG. 1 illustrates a schematic diagram of an example environment in which multiple embodiments of the present disclosure can be implemented.

The embodiments of the present disclosure will be described in more detail below with reference to the accompanying drawings. Although the drawings show some embodiments of the present disclosure, it should be understood that the present disclosure can be implemented in various forms, and should not be explained as being limited to the embodiments stated herein. Instead, these embodiments are provided for understanding the present disclosure more thoroughly and completely. It should be understood that the accompanying drawings and embodiments of the present disclosure are for illustrative purposes only, and are not intended to limit the protection scope of the present disclosure.

The term "include" and its variants as used herein mean open-ended inclusion, i.e., "including but not limited to." The term "based on" is "based at least in part on." The term "one embodiment" means "at least one embodiment." The term "another embodiment" indicates "at least one additional embodiment." Relevant definitions of other terms will be given in the description below.

During the processing of a file, data is usually first written to an internal memory, and later, when appropriate, to a persistent storage device. For example, a progress can invoke a data persistence operation (such as using a fsync function) of the system to flush a buffer area, and synchronize updated content to a persistent storage device. In this process, the invoking process of this data persistence operation involves different components of multiple layers of the system, such as an IO stack, a file system writeback/log, and a runtime workload. In some cases, a high latency that affects the running performance of the system occurs during invoking of the data persistence operation. Such high latency can block I/O operations for a long time, and in some cases, can cause operations of an application to be panic due to timeout. For example, the latency may exceed 30 seconds, sometimes even exceed 50 seconds. Therefore, an engineering team needs to identify factors that lead to the high latency when the high latency occurs, and perform targeted actions in time to eliminate the problem. However, the latency of the data persistence operation is related to a plurality of factors such as various states of a plurality of components involved in the operation and/or other configurations of the system at the time, which complicates investigating and relieving this high latency problem.

To at least partially solve the above and other potential problems, embodiments of the present disclosure propose a solution for latency processing. In this solution, the data persistence operation of the system is monitored, and various system state data related to a high latency is recorded when an event of high latency (such as a latency exceeding a threshold) of the data persistence operation (such as, fsync) occurs in the system. In this solution, a trained predictor is then used to generate data persistence operations on the basis of these system states. When an estimation result is of sufficient quality, in some embodiments of this solution, on the basis of analyzing contribution of the various system states to the estimation result generated by the predictor, one or more states that have the greatest impact (such as causing the largest increment in a total latency) on the high latency in the event of high latency are determined. Some embodiments of this solution also take into account the magnitude of the impact of the one or more system states on a user's business, and preferentially suggest actions that have less negative impact on the user's business to improve the high latency problem. When there is a high-latency problem in the data persistence operation of the system, the solution of the present disclosure can identify the most major factors that lead to this problem, and thus can provide targeted repair measures to users.

FIG. 1 illustrates a schematic diagram of example environment 100 in which multiple embodiments of the present disclosure can be implemented. Environment 100 may include computing device 110 and system 120. Although shown as separate single entities, computing device 110 and system 120 may exist and be distributed in any suitable form, and may have other relationships between them. For example, system 120 or part of system 120 may reside on computing device 110.

A progress (such as a system daemon or a client application) running in system 120 may temporarily place data in internal memory 130 (such as an internal memory) in a process of processing data, and a data persistence operation is used, when appropriate, to update and synchronize the data in internal memory 130 to persistence storage device 140. This data persistence operation may involve a plurality of components (not shown) of a plurality of layers of system 120, and has a certain latency.

Computing device 110 may monitor and record various data of system 120, such as various states of the system before and after the data persistence operation occurs (such as within a threshold event period from which it occurs) and the latency of the operation. Computing device 110 may also use the method of the present disclosure to estimate an amount of the latency when the data persistence operation has a high latency (such as a latency exceeding a threshold) to identify factors that lead to the high latency on the basis of the estimation result with sufficient quality, and to provide suggested actions for targeted improvement of the latency.

The architecture and functions of example environment 100 are described for illustrative purposes only, which does not imply any limitation to the scope of the present disclosure. There may also be other devices, systems, or components that are not shown in example environment 100. In addition, the embodiments of the present disclosure may also be applied to other environments having different structures and/or functions.

Figure 2:
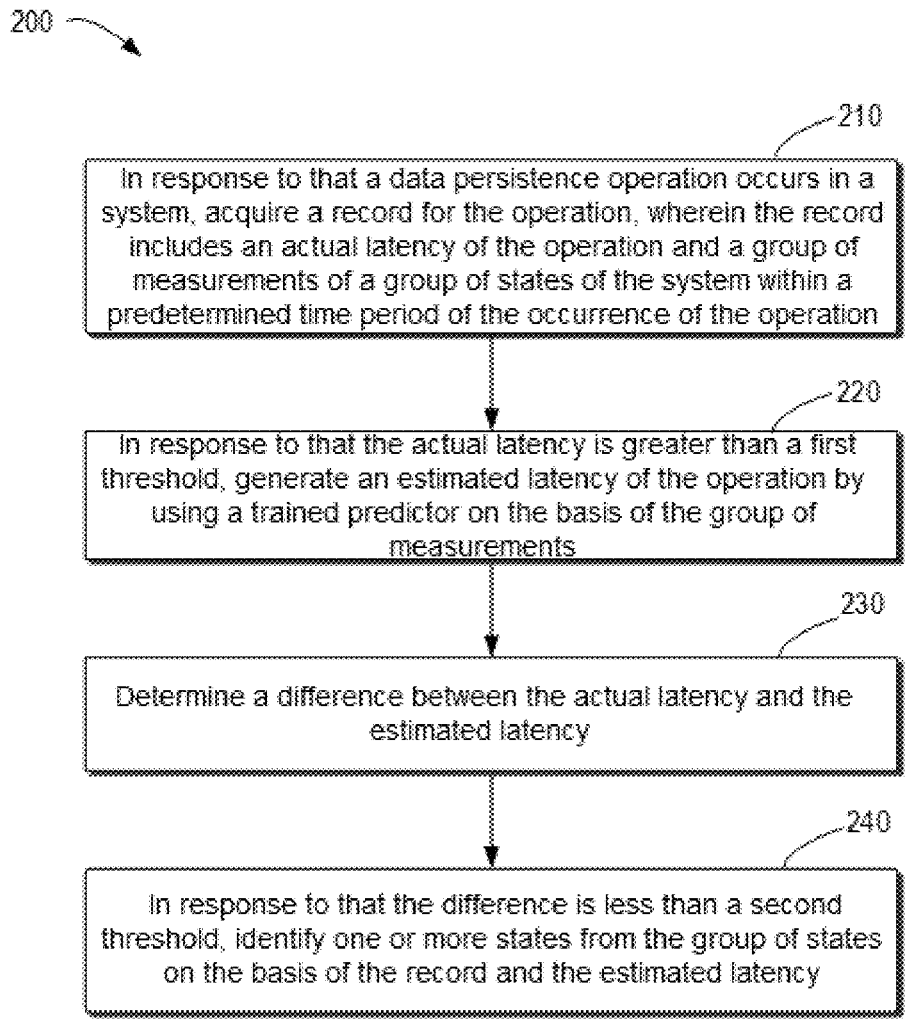
FIG. 2 illustrates an example method for latency processing according to some embodiments of the present disclosure.

FIG. 2 illustrates a flow chart of example method 200 for latency processing according to some embodiments of the present disclosure. For example, example method 200 may be performed by computing device 110 as shown in FIG. 1. It should be understood that method 200 may also include additional actions not shown, and the scope of the present disclosure is not limited in this regard. Method 200 will be described in detail below with reference to example environment 100 of FIG. 1.

At block 210, in response to that a data persistence operation occurs in a system, a record for the operation is acquired, wherein the record includes an actual latency of the operation and a group of measurements of a group of states of the system within a predetermined time period of the occurrence of the operation. For example, computing device 110 can acquire a record for the operation in response to that a data persistence operation occurs in system 120. The record includes an actual latency of the operation and a group of measurements of a group of states of the system within a predetermined time period of the occurrence of the operation.

In some embodiments, computing device 110 can monitor and record different types of states of system 120. These states indicate conditions of different domains of the system. In some such embodiments, these types may be hardware states, IO stack configurations, workload modes, and the like. The hardware states may include, but are not limited to, SMART information, an IO error, and the like of a hard drive that reflect a state of health of the hardware. The IO stack configurations may include, but are not limited to, parameters such as IO scheduler settings, a file system writeback policy, and a file system log policy. The workload modes may include, but are not limited to, progress read/write throughput (such as in bytes), system invoke (such as fsync) counts, and the like for different applications in the system.

At block 220, in response to that the actual latency is greater than a first threshold, an estimated latency of the operation is generated by using a trained predictor on the basis of the group of measurements. For example, computing device 110 may generate an estimated latency of the operation by using a trained predictor on the basis of a group of measurements of the operation in response to that the actual latency of the data persistence operation is greater than a first threshold. A latency amount within the first threshold is considered to be within a reasonable expectation, while a latency beyond the first threshold may be considered to be a high latency that adversely affects the running of the system. Therefore, computing device 110 needs to further execute subsequent steps of method 200 to investigate the latency. Computing device 110 may set the threshold on the basis of performance requirements of a particular system and/or set the threshold for a particular operation type (such as invoking a certain system function to perform the data persistence operation).

In some embodiments, computing device 110 may adopt a historical record about a data persistence operation of a particular type and train a predictor with an appropriate machine learning method. The trained predictor is used for predicting an estimated latency of an operation when it has expected quality. Thus, predictions made by the predictor can be considered to reflect actual situations well.

At block 230, a difference between the actual latency and the estimated latency is determined. For example, computing device 110 may determine a difference between the actual latency and the estimated latency (for example, the actual latency and the estimated latency of the above-mentioned operation with a high latency). Thus, computing device 110 can determine whether the estimate made by the predictor is of sufficient quality to reflect an actual latency condition for an identification step.

At block 240, in response to that the difference is less than a second threshold, one or more states are identified from the group of states on the basis of the record and the estimated latency. For example, computing device 110 may, in response to that the difference (determined at block 230) between the actual latency of the operation and the estimated latency is less than a second threshold value, identify one or more states from the group of states on the basis of the record of the operation and the estimated latency. Computing device 110 may identify, through the operation, the one or more states that have the greatest impact on the high latency of the operation.

Using method 200, computing device 110 may detect the occurrence of the event of high latency and identify major factors that cause the high latency, thereby providing a guidance for timely and targeted solution of the high latency basis.

Figure 3:
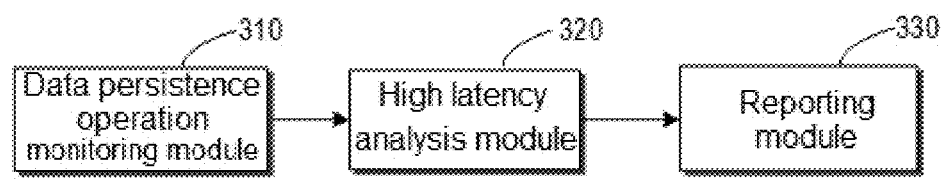
FIG. 3 illustrates an example architecture for latency processing according to some embodiments of the present disclosure.

FIG. 3 illustrates example architecture 300 for latency processing according to some embodiments of the present disclosure. Architecture 300 may be an example implementation of logic modules in computing device 110 for processing a latency (for example, the event of high latency of the data persistence operation in system 120) by the method (such as method 200) described in the present disclosure. FIG. 3 is described below with reference to example environment 100 of FIG. 2. It should be understood that other modules not shown may also be present in computing device 110. In addition, architecture 300 is provided by way of an example only, and other suitable architectures capable of implementing the solutions described in the preset disclosure may also be used.

Architecture 300 includes data persistence operation monitoring module 310, high latency analysis module 320, and reporting module 330.

Computing device 110 may use data persistence operation monitoring module 310 to monitor occurrence of a data persistence operation in system 120 and record relevant data for the operation, including an actual latency of the operation and a group of measurements of a group of states of the system within a predetermined time period of the occurrence of the operation. In some instances, computing device 110 takes statistical information of the group of states within a threshold time period (such as the last n minutes) from the occurrence of a high-latency data persistence operation as a system state associated with the operation.

Data persistence operation monitoring module 310 may also identify a data persistence operation whose actual latency is greater than a first threshold. In response to the occurrence of such an operation, high latency analysis module 320 may generate an estimated latency of the operation by using a trained predictor on the basis of the group of measurements in the record for the operation, and determine a difference between the actual latency of the operation and the estimated latency. If the difference is less than a second threshold, high latency analysis module 320 may consider that the estimate from the predictor to the latency of the operation is of sufficient quality to reflect the actual situation of the latency. In such a case, high latency analysis module 320 may perform analysis on the basis of the record of the operation and the estimated latency to identify one or more states from the recorded group of states, thereby identifying major factors that lead to the high latency of the operation. In some embodiments, if the difference is greater than the second threshold, high latency analysis module 320 may determine that the current predictor cannot make an accurate estimate on the latency of the operation, and computing device 110 may adjust the predictor with the record. For example, computing device 110 may add the record to a historical database of delayed operations for subsequent retraining of the predictor.

For estimates of sufficient quality, high latency analysis module 320 may determine contributions of the group of states to the estimated latency in generation of the estimated latency using the predictor, and determine one or more states on the basis of the contributions. In some embodiments, computing device 110 may use, for example, an additive model based on the game theory to calculate the contributions of the various system states in the estimated latency generated by the predictor. Since the estimated latency is considered to be a good reflection of the actual situation, the contributions reflect the contributions of these states to the actual latency of the operation. Therefore, high latency analysis module 320 may then determine the one or more states that have the greatest impact on the latency of the operation on the basis of the contributions.

Figure 4:
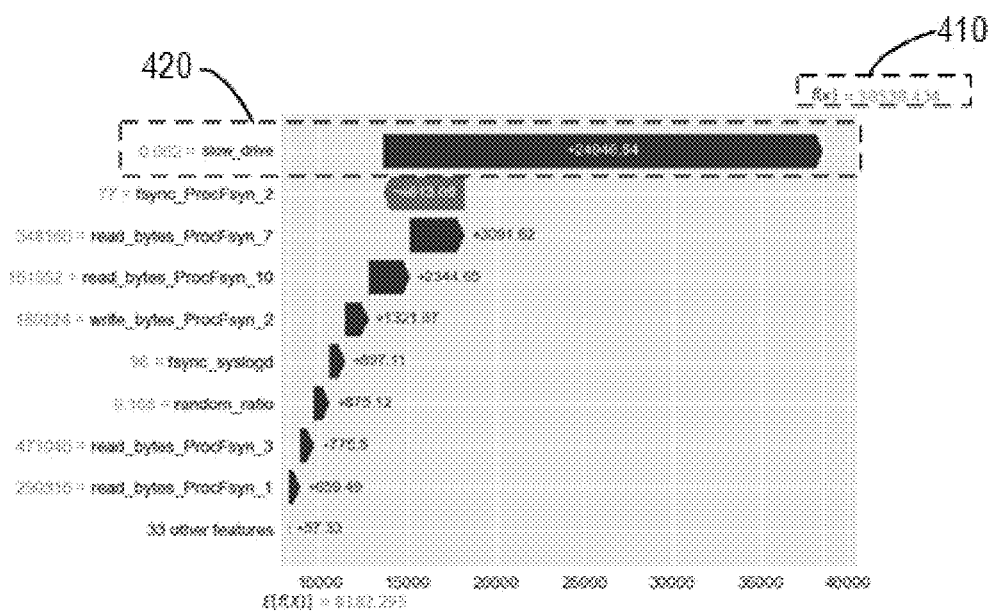
FIG. 4 illustrates example simulation results for identifying factors that lead to a high latency of a data persistence operation according to some embodiments of the present disclosure.

For illustrative purposes, FIG. 4 illustrates example visualization 400 of a high latency analysis result according to one embodiment of the present disclosure. This exemplary high latency analysis utilizes Shapley Additive Explanation (SHAP) to calculate the contribution of each state, and may be performed, for example, by high latency analysis module 320. Visualization 400 illustrates analysis results of the contributions for a data persistence operation with a high latency that exceeds a threshold (which is 30 seconds in this nonrestrictive example). Contribution values of a group of features (in this example, a group of system states) with the greatest contribution values and a total contribution value of other features are listed separately. As indicated by reference numeral 410, the latency in this nonrestrictive example is close to 40 seconds, which is close to its estimated latency f(x). As indicated by reference numeral 420, for this operation, computing device 110 may conclude that the state named "slow_drive" contributed the most (+24.946.54 seconds) to the latency of this sample. In this example, the value of this feature represents an excessive number of remapping sectors (RASs), which is indicative of media wear.

Now referring back to FIG. 3, in some embodiments, high latency analysis module 320 may also determine an order of the one or more states on the basis of the impact degrees of the one or more states on the functionality of system 120. In some embodiments, each state in the group of states can belong to the following types: a hardware state, an IO stack configuration, or a workload mode. These state types are indicative of different domains of system 120, and changing the states indicative of different domains has varying degrees of impact on the functionality (the performance of a user workload) of system 120.

In some such embodiments, high latency analysis module 320 may rank the identified one or more system states on the basis of the impact. For example, after the one or more states that cause the largest increment in the total latency of a certain data persistence operation are identified, high latency analysis module 42 may rank the hardware state that has the least impact on the performance of a workload in the first place, and then rank the I/O stack configuration state and the workload mode successively. In some such embodiments, high latency analysis module 320 may also determine the order on the basis of both the impact degree (such as the above-mentioned contribution) of the state on the latency and the impact degree of the state type on the functionality. For example, high latency analysis module 320 may group the identified one or more states on the basis of the magnitude of the impact of the type on the functionality and rank the groups, and then rank the states of this type by contributions within the ranked group, thus determining a final order. For example, high latency analysis module 320 may also weight the contributions of the states on the basis of the impact degree of the type, to which the states belong, on the functionality, and rank the one or more states on the basis of the weighted contributions.

Computing device 110 may also use reporting module 330 to generate a report about the data persistence operation with the high latency. In some embodiments, reporting module 330 may generate a first report that includes an indication of one or more states identified by high latency analysis module 320, so as to report, to a user, major factors that lead to the high latency. In this way, the user can know the reasons for the latency in time when the high latency occurs.

In some embodiments, reporting module 330 may also generate a second report on the basis of a group of measurements of the one or more states when the analyzed high-latency operation occurs, and the second report indicates the user of suggested actions used for reducing the latency. For example, reporting module 330 may further generate, on the basis of the analysis result shown in visualization 400, a suggested action for repairing or replacing a drive.

In some embodiments, in addition to information of the group of measurements, reporting module 330 may also generate a third report on the basis of the aforementioned ranking on functionality impacts, so as to indicate to the user suggested actions for reducing the latency. In some such embodiments, reporting module 330 may generate suggested actions preferentially for higher-ranked states (such as states of a type that has the least impact on the performance of a workload). For example, when high latency analysis module 320 identifies that an I/O error rate of a disk and a certain user application are the major factors of a certain high latency, reporting module 330 may preferentially suggest repairing or replacing the drive.

As described above, when used in conjunction with method 200, architecture 300 can be used to identify major factors that lead to the occurrence of the high latency if there is a high latency in a data persistence operation in the system and to provide instructions and suggestions to a user accordingly, so that the high latency problem can be handled promptly and accurately, and in some embodiments, in a manner that has a low impact on the workload of the user.

Figure 5:
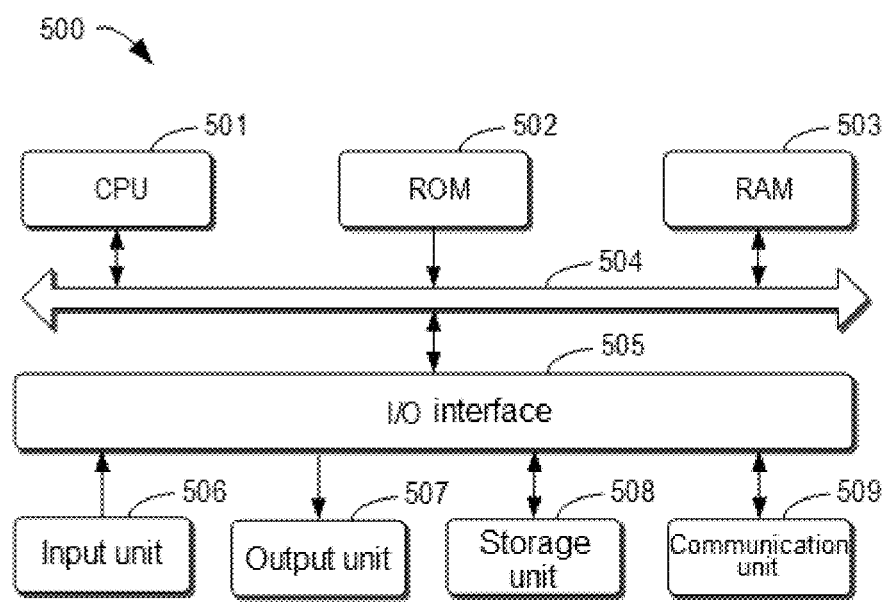
FIG. 5 illustrates a schematic block diagram of a device that may be used to implement embodiments of the present disclosure.

FIG. 5 shows a schematic block diagram of device 500 that may be configured to implement embodiments of the present disclosure. Device 500 may be the device or apparatus described in the embodiments of the present disclosure. As shown in FIG. 5, device 500 includes central processing unit (CPU) 501 which may perform various appropriate actions and processing according to computer program instructions stored in read-only memory (ROM) 502 or computer program instructions loaded from storage unit 508 to random access memory (RAM) 503. Various programs and data required for operations of device 500 may also be stored in RAM 503. CPU 501, ROM 502, and RAM 503 are connected to each other through bus 504. Input/output (I/O) interface 505 is also connected to bus 504. Although not shown in FIG. 5, device 500 may also include a co-processor.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various methods or processes described above may be performed by processing unit 501. For example, in some embodiments, the method may be implemented as a computer software program that is tangibly included in a machine-readable medium, such as storage unit 508. In some embodiments, part of or all the computer program may be loaded and/or installed to device 500 via ROM 502 and/or communication unit 509. When the computer program is loaded into RAM 503 and executed by CPU 501, one or more steps or actions of the methods or processes described above may be executed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other persons of ordinary skill in the art to understand the embodiments disclosed here.

The invention claimed is:

1. A method performed by a processing device for latency processing, comprising:
    in response to that a data persistence operation occurs in a system, acquiring a record for the data persistence operation, wherein the record comprises an actual latency of the data persistence operation and a group of measurements of a group of states of the system within a predetermined time period of the occurrence of the data persistence operation;
    in response to that the actual latency is greater than a first threshold, generating an estimated latency of the data persistence operation using a trained predictor based on the group of measurements;
    determining a difference between the actual latency and the estimated latency;
    in response to that the difference is less than a second threshold, identifying one or more states from the group of states based on the record and the estimated latency; and
    determining an order of the one or more states based on impact degrees of the one or more states on a functionality of the system.

2. The method according to claim 1, wherein a state in the group of states belongs to one of the following types:
    a hardware state, an IO stack configuration, or a workload mode.

3. The method according to claim 1, further comprising:
    generating a first report, wherein the first report comprises an indication of the one or more states.

4. The method according to claim 1, further comprising:
    generating a second report based on the group of measurements of the one or more states when the data persistence operation occurs, wherein the second report comprises an indication of a suggested action, and the suggested action is used for reducing a latency.

5. The method according to claim 1, further comprising: generating a second report based on the group of measurements of the one or more states when the data persistence operation occurs and the order, wherein the second report comprises an indication of a suggested action, and the suggested action is used for reducing a latency.

6. The method according to claim 1, wherein identifying the one or more states comprises:
   determining contributions of the group of states to the estimated latency when the trained predictor is used to generate the estimated latency; and
   determining the one or more states based on the contributions.

7. The method according to claim 1, further comprising: in response to that the difference is greater than the second threshold, adjusting the trained predictor based on the record.

8. An electronic device, comprising:
   a processor; and
   a memory coupled to the processor, wherein the memory has instructions stored therein which, when executed by the processor, cause the processor to perform actions, the actions comprising:
   in response to that a data persistence operation occurs in a system, acquiring a record for the data persistence operation, wherein the record comprises an actual latency of the data persistence operation and a group of measurements of a group of states of the system within a predetermined time period of the occurrence of the data persistence operation;
   in response to that the actual latency is greater than a first threshold, generating an estimated latency of the data persistence operation using a trained predictor based on the group of measurements;
   determining a difference between the actual latency and the estimated latency; and
   in response to that the difference is less than a second threshold, identifying as contributing to the estimated latency, one or more states from the group of states based on the record and the estimated latency; and
   generating a first report based on the group of measurements of the one or more states when the data persistence operation occurs, wherein the first report comprises an indication of a suggested action, and the suggested action is used for reducing a latency associated with the data persistence operation.

9. The device according to claim 8, wherein the actions further comprise:
   determining an order of the one or more states based on impact degrees of the one or more states on a functionality of the system.

10. The device according to claim 9, wherein a state in the group of states belongs to one of the following types:
    a hardware state, an IO stack configuration, or a workload mode.

11. The device according to claim 8, wherein the actions further comprise:
    generating a second report, wherein the second report comprises an indication of the one or more states.

12. The device according to claim 9, wherein the actions further comprise:
    generating a second report based on the group of measurements of the one or more states when the data persistence operation occurs and the order, wherein the second report comprises an indication of a suggested action, and the suggested action is used for reducing a latency.

13. The device according to claim 8, wherein identifying the one or more states comprises:
    determining contributions of the group of states to the estimated latency when the trained predictor is used to generate the estimated latency; and
    determining the one or more states based on the contributions.

14. The device according to claim 8, wherein the actions further comprise:
    in response to that the difference is greater than the second threshold, adjusting the trained predictor based on the record.

15. A non-transitory computer-readable medium having machine-executable instructions stored therein, which when executed by a processor, cause the processor to perform actions, the actions comprising:
    in response to that a data persistence operation occurs in a system, acquiring a record for the data persistence operation, wherein the record comprises an actual latency of the data persistence operation and a group of measurements of a group of states of the system within a predetermined time period of the occurrence of the data persistence operation;
    in response to that the actual latency is greater than a first threshold, generating an estimated latency of the data persistence operation using a trained predictor based on the group of measurements;
    determining a difference between the actual latency and the estimated latency; and
    in response to that the difference is less than a second threshold, identifying as contributing to the estimated latency, one or more states from the group of states based on the record and the estimated latency, wherein identifying the one or more states comprises determining contributions of the group of states to the estimated latency when the trained predictor is used to generate the estimated latency, and determining the one or more states based on the contributions.

16. The computer-readable medium according to claim 15, wherein the actions further comprise:
    determining an order of the one or more states based on impact degrees of the one or more states on a functionality of the system.

17. The computer-readable medium according to claim 16, wherein a state in the group of states belongs to one of the following types:
    a hardware state, an IO stack configuration, or a workload mode.

18. The computer-readable medium according to claim 15, wherein the actions further comprise:
    generating a first report, wherein the first report comprises an indication of the one or more states.

19. The computer-readable medium according to claim 15, wherein the actions further comprise:
    in response to that the difference is greater than the second threshold, adjusting the trained predictor based on the record.

* * * * *